United States Patent [19]
Conti et al.

[11] Patent Number: 5,848,615
[45] Date of Patent: Dec. 15, 1998

[54] CHECK VALVE CARTRIDGE FOR FLUID PUMP

[75] Inventors: Michael Conti; Lawrence W. White; William R. Tate; Stephen D. Able, all of Bryan, Ohio

[73] Assignee: Ingersoll-Rand Company, Woodcliff Lake, N.J.

[21] Appl. No.: 759,915

[22] Filed: Dec. 4, 1996

[51] Int. Cl.[6] .................................................. F16K 15/16
[52] U.S. Cl. .......................... 137/856; 137/858; 251/358
[58] Field of Search ..................................... 137/856, 858, 137/855, 857; 251/358

[56] References Cited

U.S. PATENT DOCUMENTS

| 314,107 | 3/1885 | Chappell | 137/858 |
|---|---|---|---|
| 338,609 | 3/1886 | Nysewander | 137/858 |
| 2,118,356 | 5/1938 | Money | 137/856 |
| 3,289,693 | 12/1966 | Scaramucci | 137/858 |
| 3,295,547 | 1/1967 | Scaramucci | 137/858 |
| 3,295,550 | 1/1967 | Scaramucci | 137/858 |
| 3,939,867 | 2/1976 | Lundvik et al. | 0137/856 |
| 3,949,716 | 4/1976 | Liu | 137/856 |
| 4,723,896 | 2/1988 | Fritchman | 137/856 |
| 4,895,494 | 1/1990 | Gardner | 417/239 |
| 5,285,816 | 2/1994 | Herlihy | 137/856 |
| 5,370,088 | 12/1994 | Nakamura | 137/856 |
| 5,434,107 | 7/1995 | Paranjpe | 437/225 |

FOREIGN PATENT DOCUMENTS

| 0024276 | 2/1980 | Japan | 137/856 |
|---|---|---|---|
| 0065973 | 4/1986 | Japan | 137/856 |
| 2134628 | 8/1984 | United Kingdom | 137/856 |

*Primary Examiner*—Denise L. Ferensic
*Assistant Examiner*—Joanne Y. Kim
*Attorney, Agent, or Firm*—Micahel M. Gnibus; Leon Nigohosian, Jr.

[57] ABSTRACT

A check valve cartridge for a fluid pump, the check valve cartridge including: a valve seat; a flap valve member seated on the valve seat, the flap member having a first portion movable toward and away from the valve seat; a bumper seated on the flap member, said bumper member for biasing the first portion of the flap valve member toward the valve seat. The check valve cartridge also including a stop member located on the bumper, between the stop member and the flap member; and fastening means for joining the base, flap member, bumper, and stop member to form the integral valve cartridge. The check valve cartridge is seated in a recess formed in the pump housing and is located between the pump housing and a flow manifold.

15 Claims, 4 Drawing Sheets

CHECK VALVE CARTRIDGE FOR FLUID PUMP

FIELD OF THE INVENTION

This invention generally relates to a valve for a fluid pump, and more particularly to an integral check valve cartridge for a diaphragm pump.

DESCRIPTION OF THE PRIOR ART

Diaphragm type pumps are used to transfer fluids, such as paints or waste water, which typically include solid, particulate matter or other abrasives entrained in the fluid. A swinging check valve referred to by those skilled in the art as a flap check valve or simply as a flap valve, is frequently used in diaphragm pumps to check the flow of the fluid with entrained solid particulate matter, through the pump. Conventional flap valves are opened when an associated diaphragm is moved in a first direction and are closed when the associated diaphragm is moved in a second direction.

Known flap valves are comprised of a number of discrete components attached to the pump housing. One of the check valve component parts is a unitary flap valve member that includes a stationary portion that is connected by conventional fasteners to the pump housing, and a movable portion joined to the stationary portion. The movable portion is flexed toward and away from a valve seat during pump operation to check the flow of fluid through the pump. To achieve the required valve flexibility, the flap valve members are made from a flexible, elastomeric material.

Due to the combination of the repeated flexing of the flap member during pump operation, and weakening of the flap member and valve seat as a result of scratches, gouges, and tears caused by the particulate and abrasives in the pumped fluid, the flap valve members and valve seats frequently wear out and need to be replaced.

Downtime of a pump with worn flap valve component parts is often quite lengthy. Since the flap valve components are made integral with the pump housing, replacement of worn component parts of known flap valve assemblies is difficult because a significant portion of the pump must be disassembled before the worn flap valve member and other check valve component parts can be accessed, removed, and replaced.

In conventional diaphragm pumps, the flap valve components are attached to either the pump housing or pump flow manifold using conventional fasteners. The valve seat is sandwiched between two gasket seals. The flap member is then attached to the pump housing or pump flow manifold. In order for the flap member to form the desired seal with the valve seat, the fasteners must be tightened onto the stationary portion of the flap member with the precise amount of torque. Fasteners that are tightened down onto the flap member stationary portion with too much or too little torque will prevent the flap member from producing the required seal with the valve seat and the pump will be less efficient. Using a "trial and error" technique, a pump operator can go through a number of time consuming tightening iterations before the required precise fastener tightness is achieved.

In addition to the foregoing problems associated with conventional flap valves, conventional flap valve seats also wear out frequently. Conventional flap valve seats are made from a very thin piece of metal. The thin valve seat is fastened to the interior of the pump housing. When the valve seat begins to wear out, the portion of the pump housing supporting the valve seat is exposed to the abrasives and particulate matter in the pumped fluid, which damage the pump housing. Repair and replacement of a damaged pump housing can be quite expensive and can render a pump unusable for a considerable period of time.

The foregoing illustrates limitations known to exist in present devices and methods. Thus, it is apparent that it would be advantageous to provide an alternative that simplifies replacement of flap valves. Accordingly, a suitable alternative is provided including features more fully disclosed hereinafter.

SUMMARY OF THE INVENTION

In one aspect of the present invention, this is accomplished by providing a check valve cartridge for a fluid pump comprising: a valve seat; a flap valve member seated on the valve seat, the flap member having a first portion movable toward and away from the valve seat; a bumper seated on the flap member, said bumper member for biasing the first portion of the flap valve member toward the valve seat. The check valve cartridge also including a stop member located on the bumper, between the stop member and the flap member; and fastening means for joining the base, flap member, bumper, and stop member to form the integral valve cartridge. The check valve cartridge is seated in a recess formed in the pump housing and is located between the pump housing and a flow manifold.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
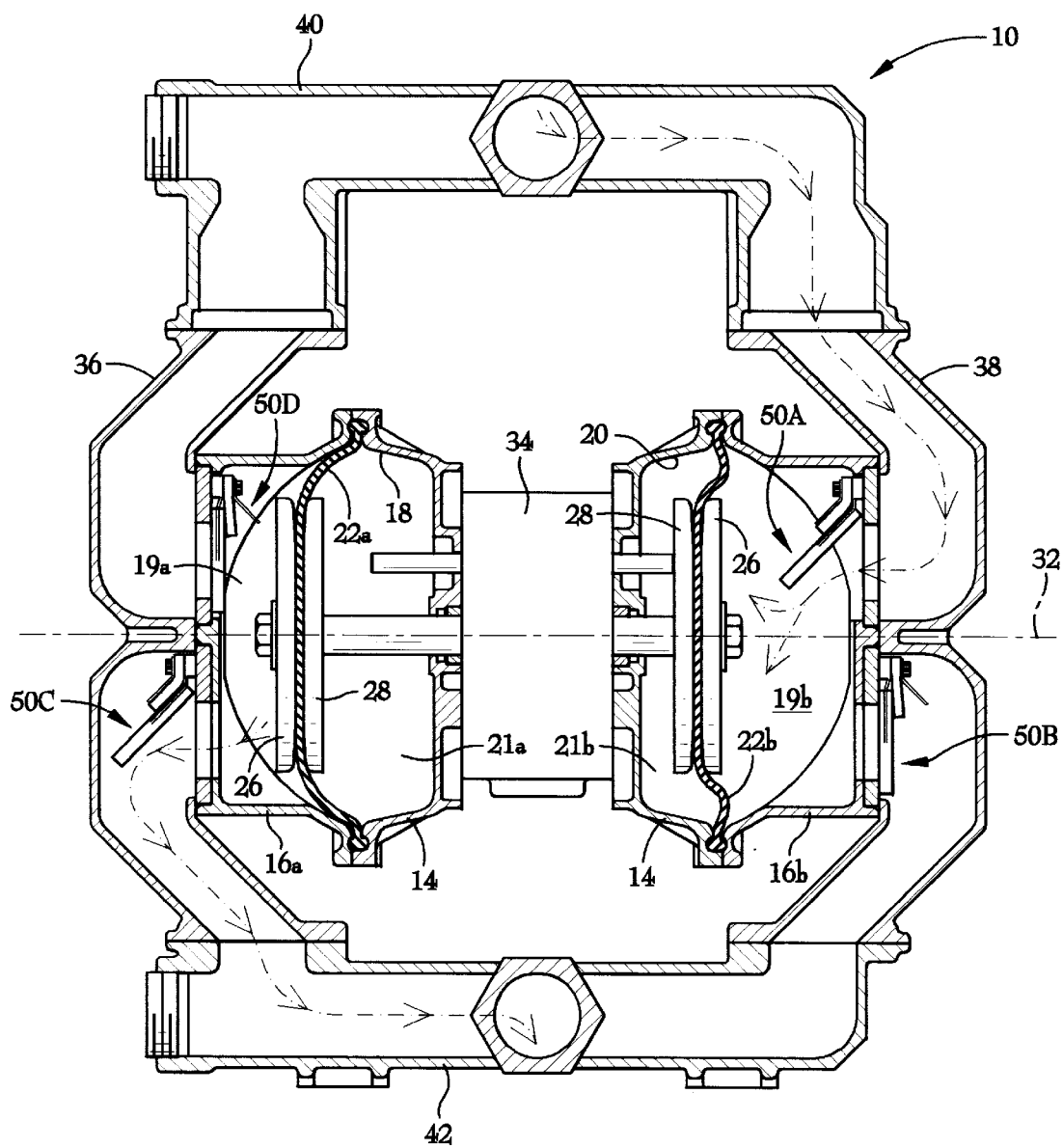
FIG. 1 is a sectional view of a diaphragm pump that includes a first embodiment of the check valve cartridge of the present invention.

Referring now to the drawings, wherein similar reference characters designate corresponding parts throughout the several views, fluid pump generally referred to at 10 in FIG. 1 is a diaphragm pump that includes a first embodiment check valve cartridge. It should be understood that fluid pump 10 may be any machine, pump or other apparatus that employs flap type check valves to control fluid flow. The fluid pump 10 is disclosed as a diaphragm pump only for purposes of describing the preferred embodiment of the invention.

FIGS. 1–5 disclose the first embodiment check valve cartridge of the present invention. As shown in FIG. 1, fluid pump 10 includes four identical first embodiment flap check valve cartridges referred to generally as 50a, 50b, 50c, and 50d. The flap check valves serve to control fluid flow through the pump 10. The first embodiment check valve cartridges will be described in further detail hereinafter.

Fluid pump 10 includes a main pump housing 14 which is adapted to be mated with first and second fluid caps 16a and 16b to define left and right diaphragm chambers 18 and 20 which are adapted to receive diaphragms 22a and 22b respectively. Conventional fasteners such as bolts (not shown) keep the main pump housing and fluid caps mated during operation of the fluid pump.

The outer periphery of each diaphragm is sandwiched between the main housing 14 and a respective fluid cap. As shown in FIG. 1, the outer periphery of diaphragm 22a is sandwiched between fluid cap 16a and housing 14; and the outer periphery of diaphragm 22b is sandwiched between fluid cap 16b and housing 14. Each diaphragm divides the respective diaphragm chamber into a fluid chamber 19a, 19b defined generally by the associated fluid cap and diaphragm, and a pressure chamber 21a, 21b defined generally by the main pump housing 14 and the associated diaphragm.

A fluid such as a gas is flowed into and exhausted from pressure chambers 21a and 21b to intermittently expand and collapse the diaphragms. Referring to FIG. 1, when gas is flowed into either pressure chamber and the respective diaphragm is expanded like diaphragm 22a, the fluid in the adjacent fluid chamber is discharged from the fluid chamber. Conversely, as gas is flowed out of either pressure chamber the respective diaphragm is collapsed like diaphragm 22b, and fluid to be pumped is flowed into the adjacent fluid chamber.

Both diaphragms 22a, 22b include a center portion that is located between a pair of plates 26 and 28. The diaphragms and plates are fixedly located along the ends of drive shaft 30 which, during fluid pump operation is displaced linearly, in a reciprocating manner along axis 32 by supplying a gas to a conventional valve system 34 which may be any well known valve system such as any pneumatically actuated valve for example. The valve system is of conventional design known to one skilled in the art and therefore does not need to be disclosed further.

Left and right pump flow manifolds 36 and 38 are mated with respective fluid caps 16a and 16b as shown in FIG. 1, and inlet manifold 40 and discharge manifold 42 are flow connected with flow manifolds 36 and 38 to provide inlet and discharge flow paths to and from the fluid chambers 19a and 19b.

Now turning to the first embodiment of the present invention, fluid pump 10 includes four like check valve cartridges, referred to generally at 50a, 50b, 50c, and 50d. Check valve cartridges 50a and 50d, control the flow of fluid into the fluid chambers; and check valve cartridges 50c and 50b control the discharge of fluid out of the fluid chambers.

Although the check valve cartridges serve different functions in pump 10, each check valve cartridge may serve either to control fluid flow into or out of the fluid chambers. In this regard, a benefit associated with use of the check valve cartridge of the present invention is that the pump 10 may be configured so that inlet fluid flows either from the top manifold 40 and discharges out manifold 42 or flows into manifold 42 and out manifold 40. In order to change the direction of flow, the check cartridges are simply flipped over so that the valves open in the required direction.

Each check valve cartridge is the same so that as the description proceeds only check valve cartridge 50a will be described.

Turning now to FIGS. 2–5, FIG. 2 shows an exploded front elevational view of the first embodiment check valve cartridge 50a. The check valve cartridge is comprised of a number of components including: a relatively thick valve seat 52 with a flow opening 54 extending through the valve seat; a flap member 56 adapted to be located on the valve seat, the flap member having a portion 60 movable toward and away from the valve seat; a bumper 64 adapted to be located on the flap member to bias the movable flap member portion 60 into sealing engagement with the valve seat; a stop member 66 located on the bumper to limit movement of the bumper and flap member portion 60 away from the valve seat; and a pair of fasteners 68 which integrally connect the check valve components to form integral check valve cartridge 50a.

Figure 2:
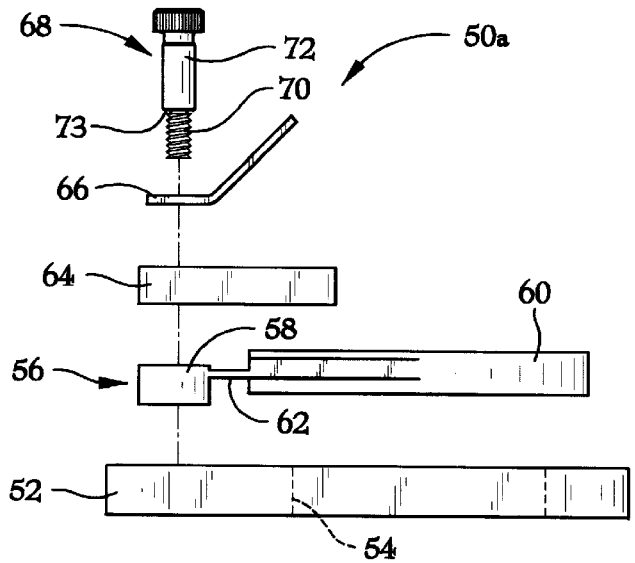
FIG. 2 is an exploded front elevational view of the first embodiment check valve cartridge shown in FIG. 1.
Figure 3:
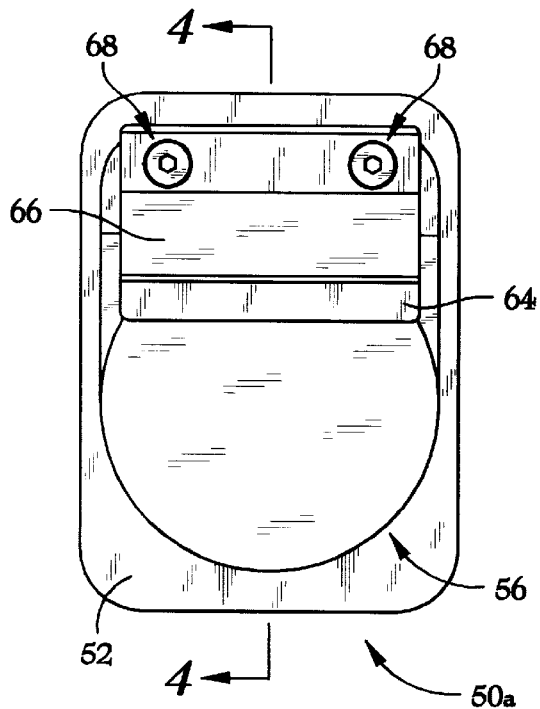
FIG. 3 is a top plan view of the first embodiment check valve cartridge shown in FIG. 1.
Figure 4:
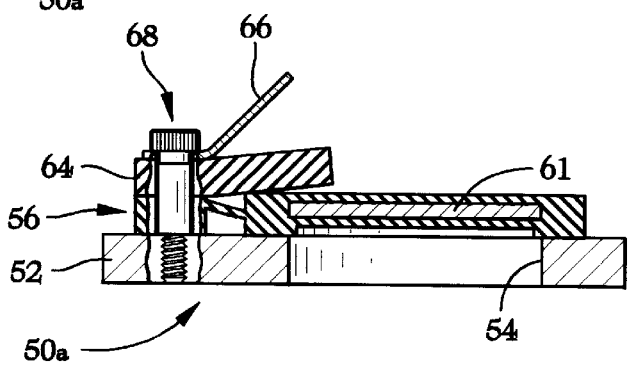
FIG. 4 is a sectional view taken along line 4—4 of FIG. 3.
Figure 5:
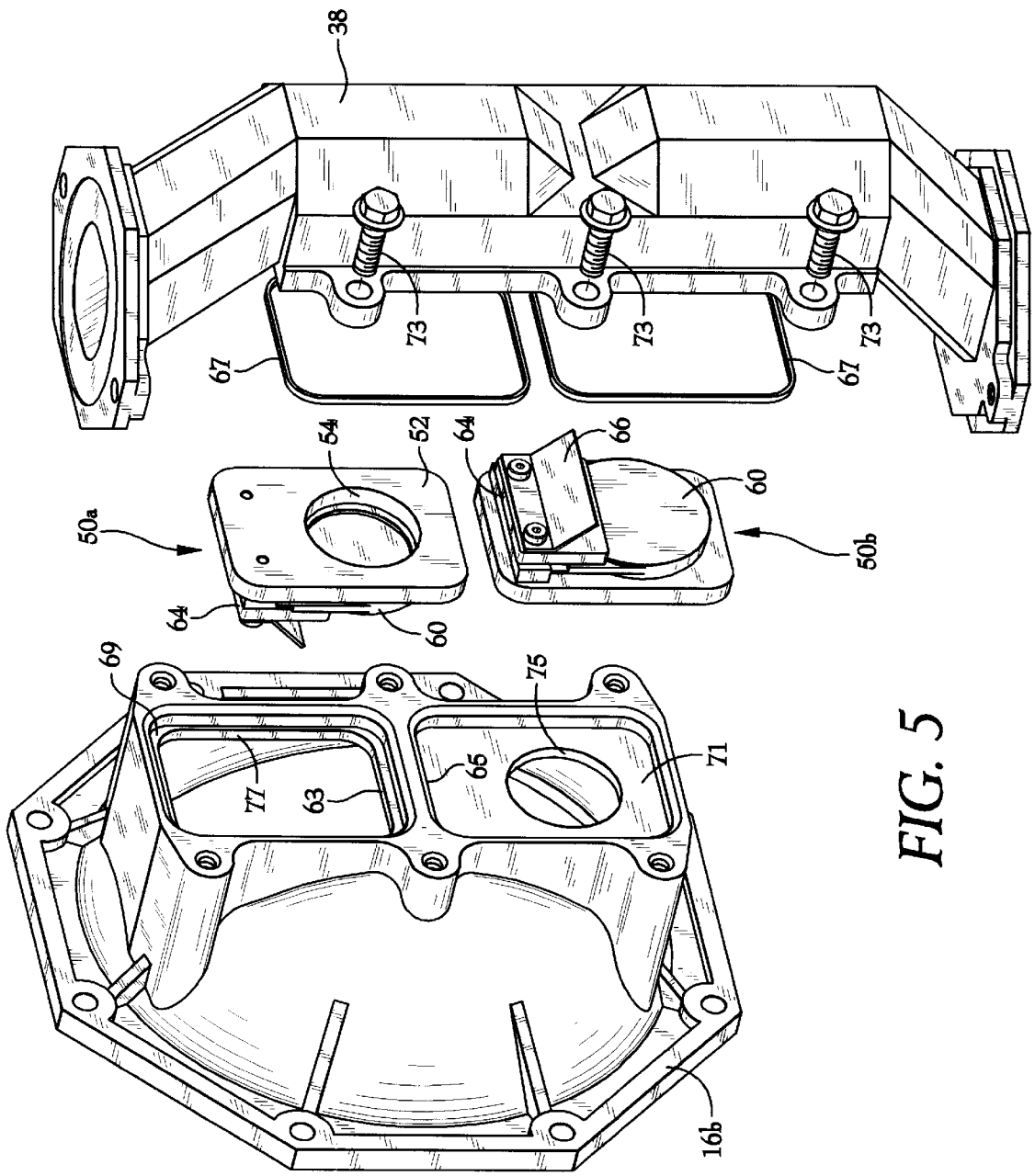
FIG. 5 is an isometric view of a portion of the pump housing, a pair first embodiment check valve cartridges, and a pump flow manifold, all shown in the pump of FIG. 1.

The preferred fasteners for integrally connecting the check valve components are the shoulder bolts shown most clearly in FIGS. 2 and 4. The shoulder bolts have a length comprised of a threaded lower portion 70 and an upper shoulder portion 72. As illustrated in FIGS. 2 and 4, the upper shoulder and threaded portions have different lateral dimensions. The upper shoulder portion 72 of the bolt 68 has a larger lateral dimension than the bolt threaded lower portion 70. As shown in FIG. 2, laterally extending preload edge 73, joins the outer edges of portions 70 and 72. The preload edge engages the valve seat to ensure that fasteners 68 are properly tightened. When the fasteners are tightened, the fasteners are tightened until the end of the shoulder portion is moved into contact with the valve seat as shown in FIG. 4. When the end of the shoulder portion contacts the valve seat, the bumper 64 and flap 56 are compressed between the fastener head and valve seat and as a result, the flap member is preloaded into sealing engagement with the valve seat. See FIG. 4. The shoulder portion limits the amount the fasteners may be tightened and, as a result, the fasteners are tightened with the predetermined required amount when the check valve cartridge is assembled.

When the fasteners are tightened completely as shown in FIG. 4, the flap valve check 56 is in sealing engagement with valve seat 52 and no further adjustment to the fasteners is required. The check valve cartridge may be assembled and disassembled quickly. Pump operators do not have to use the "trial and error" assembly technique to eventually achieve the required seal.

It has been determined that the check valve flap member forms the most effective seal with valve seat 52 when the bumper and flap valve are compressed about 8–12% by the fasteners 68. It should be understood that the proposed percent of compression may be increased or decreased from the 8–12% range by respectively increasing or decreasing the length of the shoulder portion 72.

Now turning to the discrete component parts of integral check valve cartridge 50a, unitary flap member 56 is comprised of stationary portion 58 that is secured to the valve seat by the fasteners 68. The stationary portion is joined to the movable flap portion 60 by a thin rib 62. As shown in FIG. 4, a metal plate 61 is molded or otherwise located in the flap member and provides additional stiffness to the movable portion of the flap member 56. The flap member of the first embodiment check valve cartridge is made from an elastomer.

The valve seat 52 is thicker than conventional valve seats. The preferred valve seat is approximately seven times thicker than conventional valve seats. Since the valve seat is thicker than conventional valve seats, the valve seat does not wear out as quickly as conventional valve seats. Additionally, in order to extend the useful life of the valve seat and check valve, after a number of pump cycles, the valve seat may be flipped over so that the face previously used to sealingly engage flap portion 60, is exposed directly to the fluid flow.

Assembly of pump 10 is simplified by the first embodiment check valve cartridge. Initially, during assembly of pump 10, the components of valve cartridges 50a, 50b, 50c, and 50d are made integral and preassembled. Then the check valve cartridges are seated in check valve inlet and discharge recesses 63 and 65 formed in both fluid caps 16a and 16b. See FIG. 5. Valve cartridges 50a and 50d are seated in recesses 63 and check valve cartridges 50b and 50c are seated in recesses 65. When the check valve cartridges are seated in recess 63, the outer peripheral portions of the valve seat of check valve cartridges 50a and 50d are supported by shoulder 69 along the perimeter of recess 63. The flap member passes through recess mouth 77 when the flap member movable portion is flexed.

When check valve cartridges 50c and 50b are located in recess 65, valve seat 52 of check valve cartridges 50b and 50c are seated on floor 71. Valve seat opening 54 is aligned with discharge opening 75 formed in floor 71 when the check valve cartridges are seated in the recess 65.

It should be understood that as a further improvement to the assembly of check valves, the check valve cartridges may be located in either of the recesses 63 or 65. However for purposes of clarity in the description of the invention, the check valves 50a–d are associated with one recess.

As the next step in the assembly of pump 10, seal 67 is compressed between fluid cap 16b and manifold 38 when pump flow manifold 38 which is fastened to fluid cap 16b by bolts 73. Seals like seals 67 are compressed between manifold 36 and fluid cap 16a.

Summarizing the benefits of the present invention, the integral check valve cartridge may be repaired easily and quickly. Servicing the check valves is simplified. If one of the components needs to be replaced, the manifold is removed from the fluid cap and the check valve cartridge is taken out of the cartridge opening. The worn check valve cartridge may be replaced by a new cartridge, or the worn part may be replaced by a new component part. Also, assembly of the check valve cartridges is simplified by the present invention. The fasteners may be tightened precisely and quickly during cartridge assembly. Additional adjustments to the fasteners are not required after they have been tightened. Time consuming trial and error check valve assembly techniques are eliminated.

Figure 6:
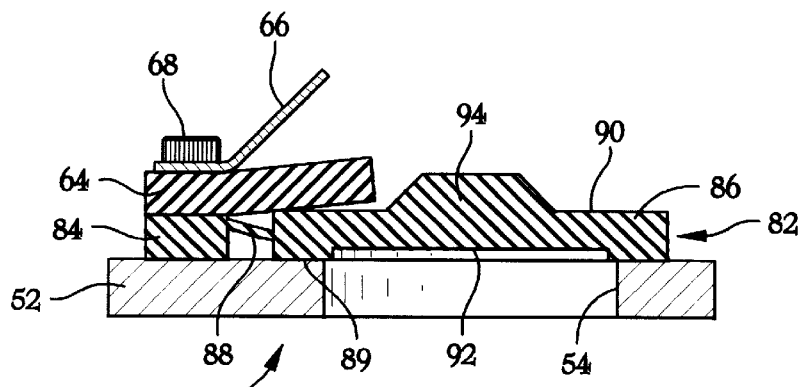
FIG. 6 is a sectional view like the sectional view of FIG. 4, showing a second embodiment check valve cartridge.
Figure 7:
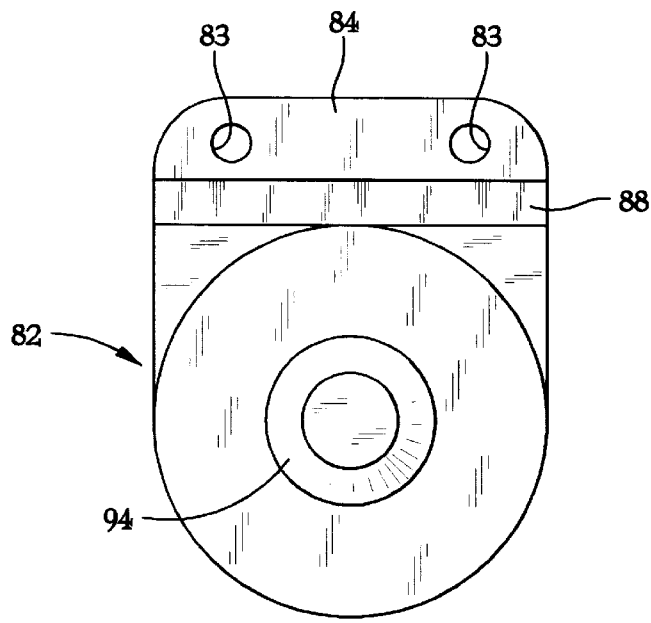
FIG. 7 is a top plan view of the flap valve member of the second embodiment check valve cartridge.
Figure 8:
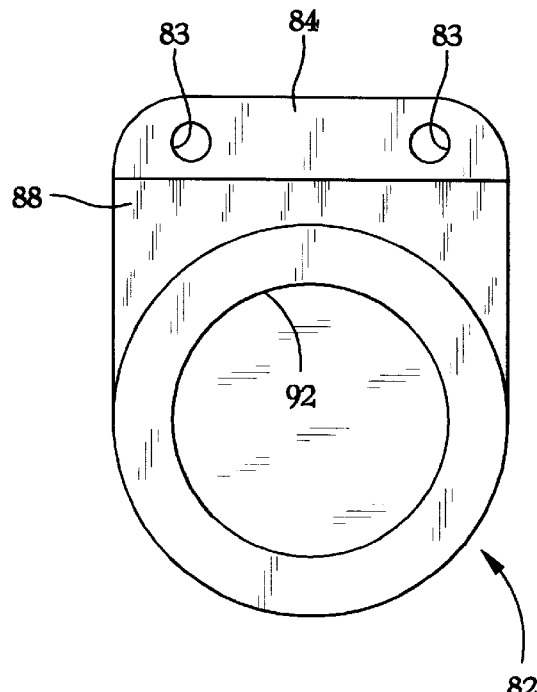
FIG. 8 is a bottom plan view of the flap valve member of FIG. 7.

A second embodiment check valve cartridge 80 is shown in FIGS. 6–8. Like first embodiment check valve cartridge 50, the second embodiment cartridge includes, valve seat 52, stop member 66, and fasteners 68, and all the previously summarized benefits associated therewith. Although a bumper 64 is shown in FIG. 6, the bumper may also be removed from the second embodiment check valve cartridge 80. The second embodiment check valve cartridge is located in pump 10 in recesses 63 and 65 of fluid cap 16, between a respective fluid cap and manifold as previously described.

The second embodiment check valve cartridge 80 includes unitary flap valve member 82 that is comprised of a stationary portion 84 and a movable portion 86 joined to the stationary portion by rib 88. The movable portion includes a first face 89 and a second face 90 with a circular recess 92 formed along the first face and a stiffening member 94 located along and extending away from the second face 90.

The flap valve member 82 is made from a fluro polymer material such as Polytetra Flourine Ethylyne (PTFE) or Perfluroalkoxy (PFA). It is preferred that the area where the rib joins the movable portion of the flap member 82 be as non-crystalline as possible to enhance the durability of the member 82. The flap member 82 may also be made from a moldable elastomer such as neoprene or nitrile for example.

The substantially conical stiffening member 94 along face 90, stiffens the movable portion of the flap valve member 82. As shown in FIG. 6, the stiffening member 94 is a frusto-conical member. The stiffening member reduces pressure and contact stresses in order to significantly extend the life of the flap valve member. The frusto-conical member eliminates the need for additional stiffening members required in flap members made from metals or composites.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A check valve cartridge for a fluid pump, the check valve cartridge comprising:
   a) a valve seat;
   b) a flap valve member seated on the valve seat, the flap valve member having a first portion movable toward and away from the valve seat;
   c) a bumper seated on the flap valve member, said bumper member for biasing the first portion of the flap valve member toward the valve seat;
   d) a stop member located on the bumper, said bumper located between the stop member and the flap valve member, said stop member for limiting the movement of the flap valve member first portion away from the valve seat; and
   e) fastening means for joining the valve seat, flap valve member, bumper, and stop member to form the integral valve cartridge, said fastening means comprising
      a compression inducing shoulder portion having a first lateral dimension,
      a threaded Portion having a second lateral dimension,
      said first lateral dimension being greater than said second lateral dimension to form a preload face joining the shoulder and threaded portions, and
      said shoulder portion having a length which is less than a combined thickness of said flap valve member, bumper, and stop member, such that upon tightening said fastening means, said preload face seats against said valve seat to cause said bumper and said flap valve member to be compressed between said stop member and said valve seat to sealingly engage said flap valve member with said valve seat.

2. The check valve cartridge as claimed in claim 1 wherein the fastening means is comprised of at least two shoulder bolts.

3. The check valve cartridge as claimed in claim 2 wherein the shoulder portion of the shoulder bolts has a predetermined length required to achieve a required percent of compression on the flap valve member and bumper.

4. The check valve cartridge as claimed in claim 1 wherein the percent of compression is about 8–12 percent.

5. The check valve cartridge as claimed in claim 1 wherein the flap member is made from a fluro polymer material.

6. The check valve cartridge as claimed in claim 5 wherein the flap valve member first portion defines a first surface and a stiffening member is located along the first surface.

7. The check valve cartridge as claimed in claim 6 wherein the stiffening member is frusto-conical.

8. The check valve cartridge as claimed in claim 7 wherein the valve seat includes a flow opening formed therein, said flow opening opened and closed by moving the first portion of the flap valve member.

9. The check valve cartridge as claimed in claim 6 wherein the flap valve member includes a second portion, a rib joining the first and second portions, the first portion including a second surface and a recess formed along the second surface.

10. The check valve cartridge as claimed in claim 6 wherein the flap valve member is unitary.

11. A check valve cartridge for a fluid pump, the check valve cartridge comprising:
   a) a valve seat;
   b) a flap valve member seated on the valve seat, the flap member having a first portion movable toward and away from the valve seat;
   c) a stop member located on the flap valve member for limiting the movement of the flap valve member first portion away from the valve seat; and
   d) shoulder bolt means for joining the valve seat, flap valve member, and stop member to form the integral valve cartridge, the shoulder bolts comprising a compression inducing shoulder portion having a first lateral dimension.
   a threaded portion having a second lateral dimension,
   said first lateral dimension being greater than said second lateral dimension to form a preload face joining the shoulder and threaded portions, and
   said shoulder portion having a length which is less than a combined thickness of said flap valve member and stop member, such that upon tightening said shoulder bolts, said preload face seats against said valve seat to cause said flap valve member to be compressed between said stop member and said valve seat by a required percent of compression to sealingly engage said flap valve member with said valve seat.

12. The check valve cartridge as claimed in claim 11 wherein the percent of compression is about 8–12 percent.

13. The check valve cartridge as claimed in claim 11, the flap valve member comprising: a first portion, a second portion, said first and second portions joined by a connection member, said first portion including a first face having a recess formed thereon, and a second face, said second face including a stiffening member formed along the second face.

14. The check valve cartridge as claimed in claim 13 wherein said stiffening member is frusto-conical.

15. The check valve cartridge as claimed in claim 13 wherein the flap valve member is made from a fluro polymer material.

* * * * *